United States Patent
Vikberg et al.

(10) Patent No.: US 10,045,198 B2
(45) Date of Patent: Aug. 7, 2018

(54) CORE NETWORK NODE SELECTION IN RADIOCOMMUNICATION SYSTEMS HAVING HOME GATEWAYS

(75) Inventors: Jari Vikberg, Järna (SE); Tomas Nylander, Värmdö (SE); Johan Rune, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 910 days.

(21) Appl. No.: 13/121,023

(22) PCT Filed: Oct. 7, 2009

(86) PCT No.: PCT/SE2009/051115
§ 371 (c)(1),
(2), (4) Date: Mar. 25, 2011

(87) PCT Pub. No.: WO2010/151197
PCT Pub. Date: Dec. 29, 2010

(65) Prior Publication Data
US 2011/0176530 A1    Jul. 21, 2011

Related U.S. Application Data

(60) Provisional application No. 61/220,343, filed on Jun. 25, 2009.

(51) Int. Cl.
*H04W 4/00* (2018.01)
*H04W 8/04* (2009.01)
*H04W 36/00* (2009.01)

(52) U.S. Cl.
CPC ......... *H04W 8/04* (2013.01); *H04W 36/0005* (2013.01); *H04W 36/0022* (2013.01); *H04W 36/0033* (2013.01)

(58) Field of Classification Search
CPC ....... H04L 41/12; H04L 43/12; H04L 12/189; H04W 24/02; H04W 36/0033;
(Continued)

(56) References Cited

U.S. PATENT DOCUMENTS

2008/0242292 A1 * 10/2008 Koskela et al. .............. 455/423
2009/0252132 A1 * 10/2009 Song et al. ................... 370/338
(Continued)

FOREIGN PATENT DOCUMENTS

WO    2010/006692 A1    1/2010
WO    2010/035971 A2    4/2010

OTHER PUBLICATIONS

R3-0830241; UE Registration w/o access control—Stage 2 text proposal; 3GPP TSG-RAN WG3 #62; Prague, Czech Republic, Nov. 10-14, 2008; section 3.
(Continued)

*Primary Examiner* — Asad Nawaz
*Assistant Examiner* — Najeebuddin Ansari
(74) *Attorney, Agent, or Firm* — Patent Portfolio Builders PLLC

(57) ABSTRACT

Systems and methods according to these exemplary embodiments provide for improving communications systems which use home gateways or the like. This can be obtained by avoiding potentially frequent inter-MME (intra-MME pool) context transfers. This can then reduce unnecessary or redundant signalling.

9 Claims, 16 Drawing Sheets

(58) Field of Classification Search
CPC ..... H04W 60/00; H04W 12/02; H04W 28/06;
H04W 4/06; H04W 72/005; H04W 74/08;
H04W 76/002; H04W 76/022; H04W
80/02; H04W 8/04
USPC ........................................................ 370/338
See application file for complete search history.

(56) References Cited

U.S. PATENT DOCUMENTS

| | | | | |
|---|---|---|---|---|
| 2009/0316657 | A1* | 12/2009 | Singh .................... | H04W 68/00 370/331 |
| 2010/0080186 | A1* | 4/2010 | Guo ...................... | H04W 28/08 370/329 |
| 2010/0105386 | A1* | 4/2010 | Guo ....................... | H04W 8/26 455/435.1 |
| 2010/0124933 | A1* | 5/2010 | Chowdhury ........ | H04L 41/0896 455/453 |
| 2010/0142367 | A1* | 6/2010 | Zhang et al. .................. | 370/216 |
| 2010/0261473 | A1* | 10/2010 | Al-Bakri ................ | H04W 8/02 455/435.2 |
| 2010/0281157 | A1* | 11/2010 | Ramankutty et al. ........ | 709/224 |
| 2010/0291943 | A1* | 11/2010 | Mihaly ............. | H04L 29/12066 455/450 |
| 2011/0110249 | A1* | 5/2011 | Schuringa et al. ........... | 370/252 |
| 2011/0261715 | A1* | 10/2011 | Norefors et al. ............. | 370/252 |
| 2011/0294509 | A1* | 12/2011 | Kim et al. .................... | 455/436 |
| 2012/0026893 | A1* | 2/2012 | Zhang et al. ................ | 370/242 |
| 2012/0028640 | A1* | 2/2012 | Guo .................. | H04L 29/12207 455/435.1 |
| 2012/0039304 | A1* | 2/2012 | Kim et al. ..................... | 370/332 |
| 2012/0069737 | A1* | 3/2012 | Vikberg et al. ............... | 370/232 |
| 2012/0113809 | A1* | 5/2012 | Cortes Gomez ............. | 370/235 |
| 2012/0129497 | A1* | 5/2012 | De Benedittis et al. ..... | 455/411 |
| 2012/0184294 | A1* | 7/2012 | Stojanovski et al. ...... | 455/456.1 |
| 2012/0250513 | A1* | 10/2012 | De Benedittis ....... | H04W 28/18 370/236 |
| 2012/0270589 | A1* | 10/2012 | Guo .................. | H04L 29/12207 455/517 |
| 2013/0217388 | A1* | 8/2013 | Guo et al. .................. | 455/435.1 |
| 2014/0038602 | A1* | 2/2014 | Guo .................. | H04L 29/12207 455/435.1 |
| 2014/0038603 | A1* | 2/2014 | Guo .................. | H04L 29/12207 455/435.1 |

OTHER PUBLICATIONS

R3-080155; HeNB's S1 simplification by means of HeNB GW; 3GPP TSG RAN WG3 Meeting #59; Sorrento, Italy, Feb. 11-15, 2008; whole document.

R3-080465; Impact on S1AP from HeNB GW concept; 3GPP TSG RAN WG3 Meeting #59; Sorrento, Italy Feb. 11-15, 2008; whole docuement.

3GPP; "Change Request TS 36.413 CR 0458 rev 1 Version 8.5.1"; R3-091478; 3GPP TSG-RAN3 Meeting #64; May 4-9, 2009; pp. 1-5; San Francisco, USA.

* cited by examiner

CORE NETWORK NODE SELECTION IN RADIOCOMMUNICATION SYSTEMS HAVING HOME GATEWAYS

RELATED APPLICATIONS

This application is the National Phase of PCT/SE2009/051115, filed Oct. 7, 2009, which claims priority under 35 U.S.C. 119(e) to U.S. Provisional Application No. 61/220,343 filed on Jun. 25, 2009. All of which are hereby expressly incorporated by reference into the present application in their entirety

TECHNICAL FIELD

The present invention relates generally to communications and in particular to methods, devices and systems for core network node selection in radiocommunication systems having home gateways.

BACKGROUND

Radiocommunication networks were originally developed primarily to provide voice services over circuit-switched networks. The introduction of packet-switched bearers in, for example, the so-called 2.5 generation (G) and 3G networks enabled network operators to provide data services as well as voice services. Eventually, network architectures will likely evolve toward all Internet Protocol (IP) networks which provide both voice and data services. However, network operators have a substantial investment in existing infrastructures and would, therefore, typically prefer to migrate gradually to all IP network architectures in order to allow them to extract sufficient value from their investment in existing infrastructures. Also to provide the capabilities needed to support next generation radiocommunication applications, while at the same time using legacy infrastructure, network operators could deploy hybrid networks wherein a next generation radiocommunication system is overlaid onto an existing circuit-switched or packet-switched network as a first step in the transition to an all IP-based network. Alternatively, a radiocommunication system can evolve from one generation to the next while still providing backward compatibility for legacy equipment.

Specification is ongoing in 3GPP for Evolved Universal Terrestrial Radio Access Network (E-UTRAN) that is the next generation of Radio Access Network (RAN). Another name for E-UTRAN, used in the present specification, is Long Term Evolution (LTE) RAN. The core network to which E-UTRAN is connected is called Evolved Packet Core (EPC), also known as System Architecture Evolution (SAE) network. Both the E-UTRAN and the EPC (and possibly some other node(s), such as the Home Subscriber Server (HSS), depending on the definition of the EPC) comprise together the Evolved Packet System (EPS), which is also known as the SAE/LTE network. A base station in this concept is called an E-UTRAN NodeB (eNodeB or eNB). These ongoing studies also include the possibility to have an E-UTRAN base station which provides home or small area coverage for a limited number of users. This base station is, in 3GPP and in this document, called a Home E-UTRAN NodeB (HeNB) or home base station. Other names used for this type of base station are LTE Home Access Point (LTE HAP) and LTE Femto Access Point (LTE FAP).

The HeNB would typically provide regular service for the end users and would be connected to the mobile core network using an IP-based transmission link. The radio service coverage provided by an HeNB is called a femtocell in this application. Furthermore, a femtocell is normally a Closed Subscriber Group (CSG) cell, i.e., a cell in which only a limited set of users is normally allowed to access the network. The HeNB would, in most cases, use the end user's already existing broadband connection (e.g. xDSL and Cable) to achieve connectivity to the operator's mobile Core Network (CN) and possibly to other eNBs/HeNBs. One of the main reasons for providing wireless local access using HeNBs and femtocells is to provide cheaper calls or transaction rates/charges when a device (e.g., a mobile phone) is connected via an HeNB as compared to when that device is connected via an eNB.

More generally, an HeNB and similar devices can be considered to be a sort of "home base station". As used herein, the term "home" is used to modify the phrase "base station" to distinguish such equipment from other conventional base stations based upon characteristics such as one or more of: (1) geographic radio coverage provided (i.e., home base station coverage area is normally less than "regular" base station coverage area), (2) subscriber access (i.e., the subscribers who can obtain service from the home base station may be limited whereas a "regular" base station will typically provide access to any subscribers (or at least to a larger group of subscribers than a home base station) who are within range, and (3) home base stations are normally installed by the end users themselves without any intervention from the operator's personnel, whereas regular base stations are typically installed by operator personnel. This latter quality of home base stations suggests that the installation will generally be highly automated and of a "plug and play" nature. Note, however, that home bases stations need not literally be installed in personal residences, and may find applications in businesses, public areas, etc., wherein the qualities of a home base station are desirable to, e.g., supplement coverage provided by regular base stations. Home gateways, as the phrase is used herein, are gateways which interface home base stations with a node in the radiocommunication system, e.g., a core network node.

It is envisioned that a mobile radiocommunication network which implements this type of architecture may have several hundreds of thousands or even a million or more HeNBs or other types of home base stations connected thereto. Such a large number of access points will present various challenges relating to their connections to the core network. Accordingly, it would be desirable to have methods and systems which address core network node selection challenges/issues such as those posed by the introduction of home base stations.

SUMMARY

Exemplary embodiments relate to systems and methods for improving communications in systems which use home gateways or the like. According to exemplary embodiments it is desirable to avoid potentially frequent inter-MME (intra-MME pool) context transfers. Advantages according to exemplary embodiments described herein include, for example, reducing unnecessary or redundant signalling. However, it will be appreciated by those skilled in the art that such advantages are not to be construed as limitations of the present invention except to the extent that they are explicitly recited in one or more of the appended claims.

According to one exemplary embodiment, a method for selecting a core network node for establishment of a connection in a radiocommunication system includes the steps of: receiving, at a home gateway, a connection establishment message without an S-Temporary Mobile Subscriber Identity (S-TMSI); and selecting, based upon information in a field in the connection establishment message, the core network node for establishment of the connection.

According to another exemplary embodiment, a communications node for selecting a core network node for establishment of a connection in a radiocommunication system includes: a communications interface for receiving a connection establishment message without an S-Temporary Mobile Subscriber Identity (S-TMSI); and a processor for selecting, based upon information in a field in the connection establishment message, the core network node for establishment of the connection.

According to another exemplary embodiment, a method for selecting a core network node for establishment of a connection in a radiocommunication system includes the steps of: transmitting, from a home base station, a connection establishment message, wherein the connection establishment message includes information in a field disposed outside of an attached non-access stratum (NAS) message, which information is usable for selection of said core network node.

According to another exemplary embodiment, a communications node for selecting a core network node for establishment of a connection in a radiocommunication system includes: a communications interface for transmitting, from a home base station, a connection establishment message, wherein the connection establishment message includes information in a field disposed outside of an attached non-access stratum (NAS) message, which information is usable for selection of said core network node.

BRIEF DESCRIPTION OF THE DRAWINGS

The accompanying drawings illustrate exemplary embodiments, wherein:

FIGS. 3-5(a) illustrate various portions of exemplary architectures including HeNBs, HeNB GWs and a Mobility Management Entity (MME) pool according to exemplary embodiments;

ABBREVIATIONS

Figure 1:
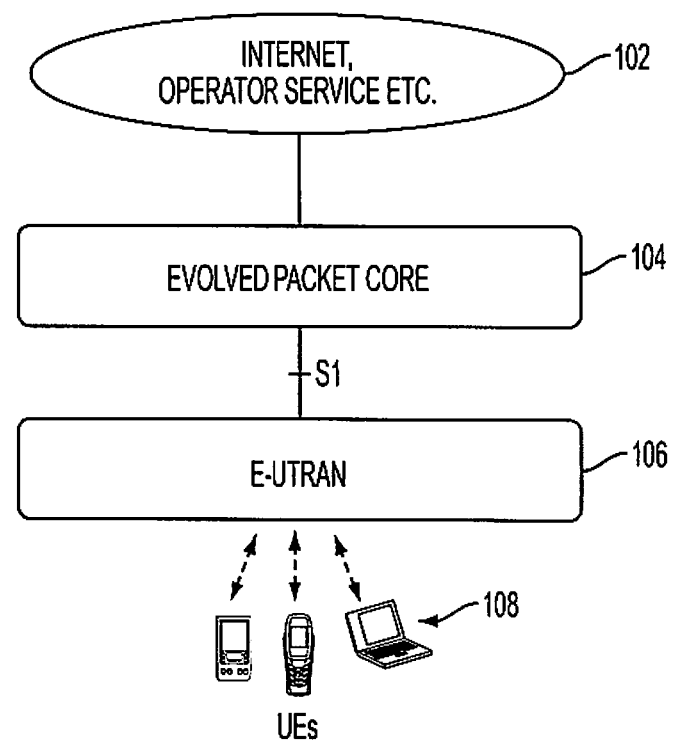
FIG. 1 depicts an overview of a system within which exemplary embodiments can be implemented.

3G $3^{rd}$ Generation
3GPP $3^{rd}$ Generation Partnership Project
CN Core Network
CSG Closed Subscriber Group
CSG ID CSG Identity
ECGI E-UTRAN Cell Global Identity
eNodeB E-UTRAN NodeB
eNB E-UTRAN NodeB
EPC Evolved Packet Core
EPS Evolved Packet System
E-UTRAN Evolved UTRAN
FAP Femto Access Point
GPRS General Packet Radio Service
GUMMEI Globally Unique MME Identity
GUTI Globally Unique Temporary Identity
GW Gateway
HAP Home Access Point
HeNB Home eNB
HeNB GW Home eNB Gateway
HNB Home Node B
HNBAP Home Node B Application Part
HNB GW Home Node B Gateway
ID Identity
IE Information Element
IP Internet Protocol
Iu Interface/reference point between Node B (or HNB GW) and 3G UMTS CN
LTE Long Term Evolution
MCC Mobile Country Code
MG W Media Gateway
MME Mobility Management Entity
MMEC MME Code
MMEGI MME Group Identity
MNC Mobile Network Code
MSC Mobile Switching Centre
M-TMSI M-Temporary Mobile Subscriber Identity
NAS Non-Access Stratum
PLMN Public Land Mobile Network
PLMN ID PLMN Identity
RAN Radio Access Network
RANAP Radio Access Network Application Part
RRC Radio Resource Control
RUA RANAP User Adaptation
S1 Interface between eNB and CN, or between HeNB GW and CN, or between HeNB and HeNB GW, or between HeNB and CN
S1AP S1 Application Protocol
S1-MME Control Plane of S1
S1-U User Plane of S1
SAE System Architecture Evolution
SCTP Stream Control Transmission Protocol
SGSN Serving GPRS Support Node
S-TMSI S-Temporary Mobile Subscriber Identity
SW Software
TA Tracking Area
TAI Tracking Area Identity TAU Tracking Area Update
TS Technical Specification
UE User Equipment
UMTS Universal Mobile Telecommunications System
UTRAN Universal Terrestrial Radio Access Network
WCDMA Wideband Code Division Multiple Access
X2 Interface between eNBs
xDSL X Digital Subscriber Line (referring to the DSL family of technologies where "X" stands for any of the letters that can be placed before "DSL", e.g. A or V)

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Prior to discussing other aspects of the exemplary embodiments below, a purely illustrative overview of a system in which signaling connections (or sessions) can be established, and in which core network nodes for such connections can be selected, will now be described with respect to FIGS. 1-5 to provide some context for this discussion. According to exemplary embodiments, a communication system in which signaling connections can be established is shown generally in FIG. 1 and includes various user equipments (UEs) 108, e.g., mobile phones, laptop computers and personal digital assistants (PDAs), which communicate over a wireless interface with an Evolved Universal Terrestrial Radio Access Network (E-UTRAN) 106. The E-UTRAN 106 communicates with nodes in the Evolved Packet Core (EPC) 104 over S1 interface(s). The EPC 104 can then route calls/requests from the UEs 108 to various separate networks and services as shown generally by the Internet/Operator Service 102.

Figure 2:
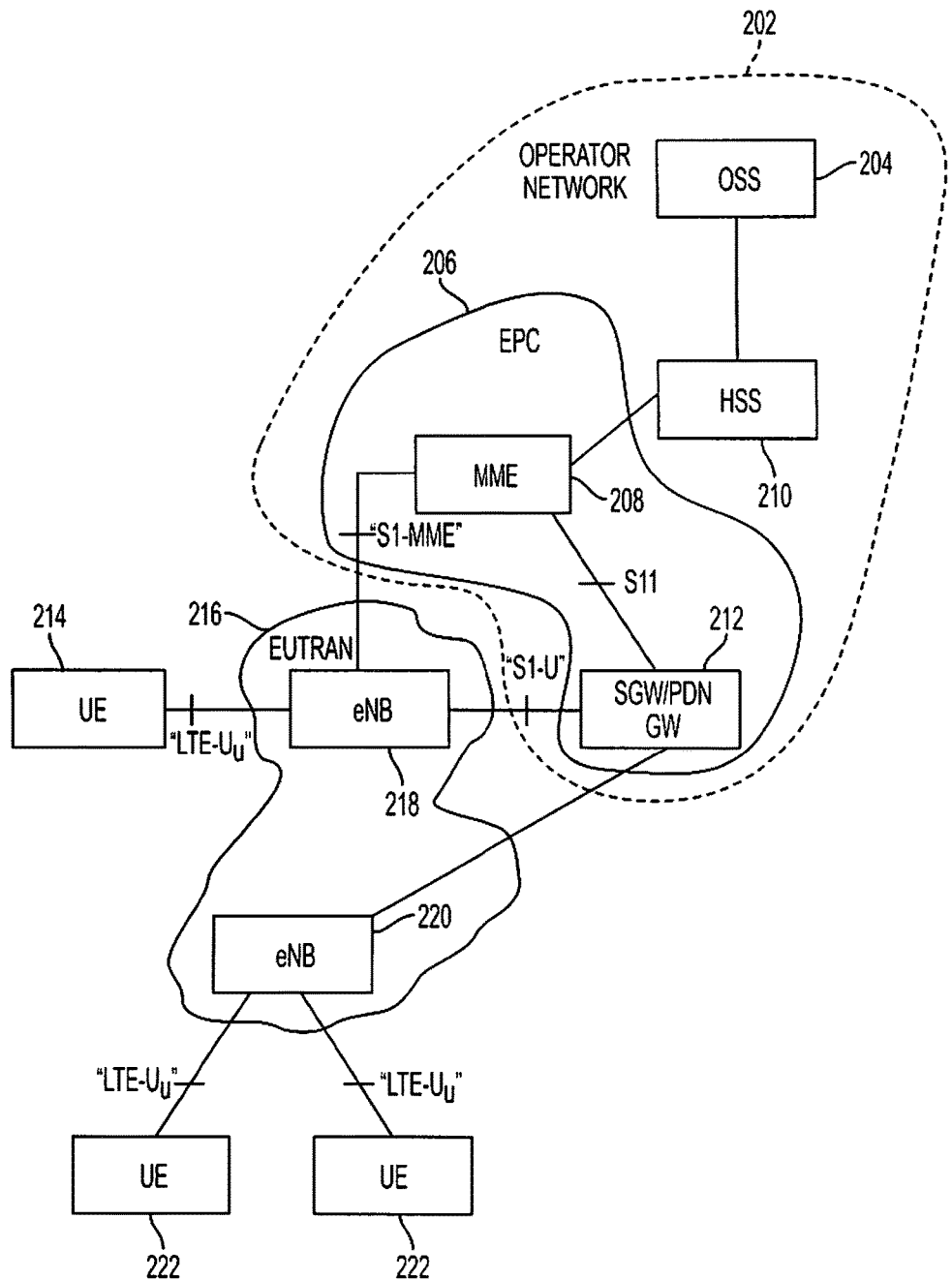
FIG. 2 illustrates an operator network in communication with an Evolved Universal Terrestrial Radio Access Network (E-UTRAN) in which exemplary embodiments can be implemented.

According to exemplary embodiments, a long term evolution (LTE) radio access network (RAN)/system architecture evolution (SAE) network can include various control functions and nodes for radio resource management. For example, FIG. 2 shows a simplified version of an Operator Network 202 which includes an Operations Support System (OSS) 204, a Home Subscriber Server (HSS) 210 and an Evolved Packet Core (EPC) 206. An OSS 204 is generally a focal point from which an operator can control the network 202 and perform functions such as configuration of network components and other operations/maintenance support functions. The EPC 206 includes a mobility management entity (MME) 208 which can perform (and/or support) various functions of the RAN such as, bearer management functions, authentication and gateway selection (e.g. selection of the Serving GW (SGW)). The home subscriber server (HSS) 210 is a database containing subscriber information which supports authentication/authorization issues associated with UEs 214, 222 (and other nodes). Note that the HSS 210 may sometimes, depending on the EPC definition, be considered a part of the EPC 206. The EPC 206 also includes a Serving Gateway (SGW)/Packet Data Network Gateway (PDN GW) 212. The SGW function performs a variety of tasks, such as packet routing and forwarding, mobility anchoring for inter-3GPP mobility, i.e. mobility between different cellular network using 3GPP technology, as well as being the gateway which terminates the S1-U interface towards the E-UTRAN 216. The PDN GW (PGW) function also performs a variety of tasks, such as IP address allocation for UEs 214, 222, and is a link to other networks, e.g., the Internet, as well as being an anchor point for mobility between 3GPP networks and non-3GPP networks. While shown as a single entity, the SGW/PDN GW 212 can be implemented as separate entities within the EPC 206.

The E-UTRAN 216 includes a number of eNodeBs (eNB) 218, 220 which communicate with the EPC 206 over versions of the S1 interface, e.g., S1-MME towards the MME(s) and S1-U towards the SGW(s). Additionally, the eNBs 218, 220 can communicate wirelessly with various UEs 214, 222 over a wireless interface denoted by "LTE-Uu". The connection between the eNB 220 and an MME (which may be the same as or different from MME 208) is omitted to simplify the figure. Other connections have also been omitted to simplify the figure, e.g., the OSS 204 can be connected to all of the other nodes in the network in addition to the HSS 210. Additionally, it will be appreciated by those skilled in the art, and as described in more detail below, that an eNB can be connected to a plurality of MMEs. Moreover, the eNBs 218 and 220 may also be considered to be part of the operator network 202.

Figure 3:
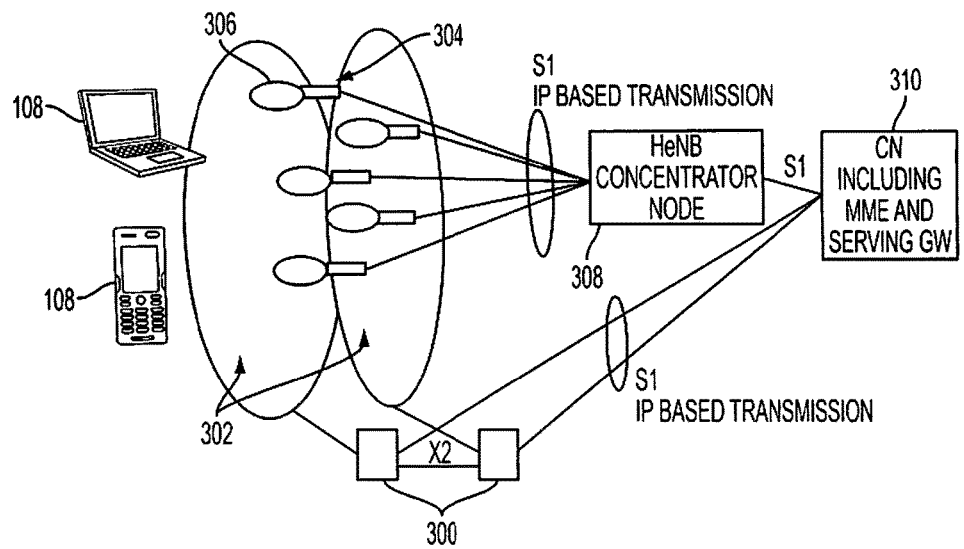

System architectures according to exemplary embodiments will also include HeNBs (or more generally "home base stations") in addition to, potentially, those nodes illustrated in FIG. 2. FIG. 3 shows aspects of an exemplary LTE RAN architecture and relevant interfaces with, for example, eNBs 300 serving macrocells 302 and HeNBs 304 serving femtocells or microcells 306. As used herein, the term "home" as it is used to modify the phrase "base station" is intended to distinguish such equipment from other conventional base stations based upon characteristics such as one or more of the three characteristics described above in the Background section of this application. Additionally, an HeNB 304 will typically have only one S1 connection toward the network, i.e., its connection to the HeNB GW 308, whereas an eNB 300 will typically have multiple "S1-flex" connections toward various nodes in the network. Although the word "home" is used to distinguish these different types of equipment, it should be noted that home base stations are not limited to base stations which are literally disposed within a home nor are home base stations limited to base stations which provide radiocommunication service to only one home. For example, a home base station can be used to supplement coverage of a "regular" base station in congested public areas. Similarly, a home gateway is a gateway or concentrator node which connects one or more home base stations to a node in a core network 310, e.g., an SGW/PDN GW 212 and/or an MME 208, but is not itself typically located within a home. The HeNB Concentrator Node 308 shown in FIG. 3 is also referred to herein as an HeNB Gateway (HeNB GW) or, more generally, a "home gateway".

However, the home gateway node 308 may also provide some of the functionality which would otherwise be provided by the home base stations 304 so that these home base stations 304 can be kept relatively simple and cheap. One example of such functionality is the RAN part of the CN Pool (e.g., MME Pool) functionality (sometimes also denoted "S1-flex" as mentioned above), e.g. selection of the MME Pool member, a MME 208, for a particular UE 108, that can be implemented in the home gateway node 308. The home gateway 308 may also hide the signaling load related to turning on and off the home base stations 304 from the core network 310. For example, when an HeNB 304 is powered on and off then only the S1 interface between the HeNB 304 and the HeNB GW 308 is affected (e.g. established, torn down, re-established, etc.) without the involvement of the MME(s) 208. UEs 108 which are located within a femtocell 306 may obtain radiocommunication service from either that femtocell or the overlapping macrocell 302 (if one is present), according to rules established for this particular network.

As mentioned above in the Background section, a mobile network may have several hundreds of thousands or a million or more HeNBs 304. It is anticipated that the control nodes in the CN 310 (e.g., MMEs 208) will not be able to handle that many HeNBs 304, i.e., the handling of that many S1 control parts or interfaces (S1-MMEs) seems unreasonable. Therefore, one purpose of the HeNB GW 308 is to conceal the large number of HeNBs 304 from the CN 310. The HeNB GW 308 will, from the CN's perspective (S1 interface), look like one eNB with many cells. The HeNB GW 308 will act as a proxy for all the HeNBs 304 that are connected to the HeNB GW 308. From an HeNB perspective, the HeNB GW 308 will look like CN 310 (also an S1 interface).

With its proxy role, and its architectural location between HeNBs 304 and MMEs 208, the main task of the HeNB GW 308 is to relay S1AP signaling messages between the HeNBs 304 and the MMEs 208, and vice versa. The HeNB GW 308 should be basically transparent in this regard and should have to extract very little information from the relayed S1AP messages. For example, the Non-Access Stratum (NAS) signaling is opaque for the HeNB GW 308 (especially so since most NAS messages are encrypted between the UE 108 and the MME 208). In 3G UMTS the node corresponding to HeNB 304 is called Home Node B (HNB) and the node corresponding to the HeNB GW 308 is called Home Node B Gateway (HNB GW). There are some differences between the HeNB GW 308 and the HNB GW. One difference is that the HNB GW is currently mandatory in a 3G UMTS network supporting HNBs, whereas the HeNB GW 308 is optional in an EPS system supporting HeNBs 304. Another difference is that the HNB GW terminates two protocols towards the HNB, the Home Node B Application Part (HNBAP) protocol (see 3GPP TS 25.469) and the RANAP User Adaptation protocol (see 3GPP TS 25.468), whereas the HeNB GW 308 is almost a pure relay node for the 3GPP protocols, i.e., lower layer protocols tend to be terminated and higher layer protocols tend to be passed through the HeNB GW 308. A consequence of these differences is that in 3G UMTS the interface/reference point between the HNB and the HNB GW (Iuh) is different from the interface/reference point between the HNB GW and the 3G UMTS core network nodes (SGSN, MSC, MSC server, MGW) (Iu), whereas in EPS the interface/reference point between the HeNB and the HeNB GW is the same as the interface/reference point between the HeNB GW and the EPC core network nodes, e.g., MME, SGW, i.e., S1 in both cases. Another consequence is that an HNB, using the protocols that are terminated in the HNB GW, can send information directed to the HNB GW, whereas a HeNB 304, in principle, cannot send any information directed to the HeNB GW 308.

Figure 4:
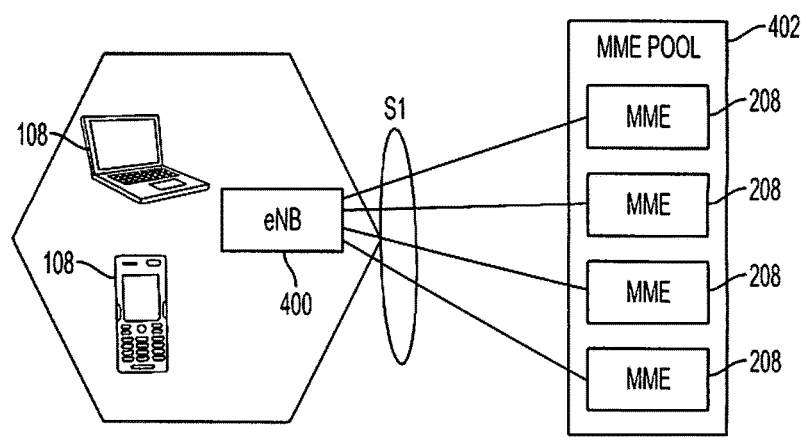

As seen in FIG. 4, an eNB 400 typically has S1 interfaces to all members in an MME pool 402, and the MMEs 208 have unique identities, referred to as GUMMEIs (Globally Unique MME Identities), that are conveyed to the eNB 400 when the S1 interface connection is established. When a UE 108 attaches to the network and to an MME 208, it is allocated a temporary identity, e.g., a GUTI (Globally Unique Temporary Identity). A GUTI consists of two parts, one part that identifies the MME 208 which allocated the GUTI and which holds the UE context, and one part which identifies the UE 108 within the MME 208. The part that identifies the MME is the Globally Unique MME Identity (GUMMED, which in turn consists of a PLMN ID (i.e., MCC+MNC), an MME group identity (MMEGI) which identifies the MME pool and an MME code (MMEC) which identifies the MME within the pool. The part of the GUTI that identifies the UE 108 within the MME 208 is called M-TMSI. The combination of MMEC and M-TMSI is denoted S-TMSI. The S-TMSI is used for identification of the UE 108 in situations where the PLMN ID and MMEGI are known.

When a UE 108 accesses an eNB 400 to establish an RRC signaling connection, it identifies itself with the S-TMSI in an RRCConnectionRequest message, if the TAI of the current cell is included in the UE's TAI list (i.e., if the UE 108 is registered in the current TA). Otherwise the UE 108 uses a random number as its identity in the RRCConnectionRequest message. If the UE 108 provides the S-TMSI, the eNB 400 can use the MMEC part of the S-TMSI to figure out which MME 208 in the pool holds the UE context. The UE 108 may also indicate the MME 208 in which it is registered by providing the GUMMEI of that MME 208 in the RRCConnectionSetupComplete message (which concludes the RRC connection establishment procedure).

When the eNB 400 can identify the MME 208 that holds the context of the UE 108 (and this MME 208 belongs to an MME pool 402 to which the eNB 400 is connected), the eNB 400 selects this MME 208 for the UE 108 and transfers the first NAS message from the UE 108 to the selected MME 208 in the S1AP INITIAL UE MESSAGE. In this S1AP INITIAL UE MESSAGE, the eNB 400 also includes the TAI and ECGI of the current cell. If the eNB 400 received the S-TMSI from the UE 108, it also includes this identifier in the S1AP INITIAL UE MESSAGE. If the eNB 400 is a HeNB 304 and the current cell 302 is a CSG cell, the HeNB 304 also includes the CSG ID of the current cell in the S1AP INITIAL UE MESSAGE. If the eNB 400 cannot determine which MME 208 the UE 108 is registered in, or if the UE's registered MME 208 belongs to an MME pool 402 to which the eNB 400 is not connected, the eNB 400 selects an MME 208 more or less at random (e.g., using a weighted round-robin algorithm).

According to exemplary embodiments, there arises the issue of how to select one of a plurality of core network nodes, e.g., an MME 308, to handle a signaling connection in architectures which involve the afore-described home base stations and home gateways. For context, FIG. 5(*a*) shows an example of an MME pool 500 and a HeNB Gateway 502 (also called a "concentration node") connected to CN pool nodes 208 and home base stations 504 in an exemplary LTE RAN in more detail. In a scenario where an HeNB GW 502 is deployed, an HeNB 504 should only have one S1 interface to the allocated HeNB GW 502, and the HeNB GW 502 is the entity that has multiple S1 interfaces to the different MMEs 208 in a pool 500.

The choice of selecting a particular MME 208 within the MME pool 500 for a particular UE's 108 connection may be, in many cases, a straightforward task for the HeNB GW 502. At Attach, e.g., when a UE 108 joins a femtocell 306 associated with an HeNB 504, there is no current MME 208 to identify so the HeNB GW 502 selects an MME 208 using a default algorithm, e.g., a weighted round-robin algorithm. Likewise, when the UE's 108 current MME 208 is located in another MME pool 500, the HeNB GW 502 can select the MME 208 using the default algorithm. When the UE 108 is registered in the tracking area (TA) of the current femtocell 306 (i.e., the tracking area identity (TAI) of the femtocell 306 is included in the TAI list of the UE 108), the UE's S-TMSI is included in the S1AP INITIAL UE MESSAGE. The HeNB GW 502 can then extract the MMEC from the S-TMSI and select the MME 208 indicated by the MMEC for the UE 108. However, when the UE's 108 current (serving) MME 208 belongs to the MME pool 500 of the HeNB GW 502, but the UE 108 is not registered in the TA of the femtocell 306 (i.e. the TAI of the femtocell 306 is not included in the TAI list of the UE 108) and the UE 108 consequently initiates a tracking area update (TAU) in the femtocell 306, then there is no S-TMSI in the S1AP INITIAL UE MESSAGE that the HeNB GW 502 can utilize to identify the UE's 108 current (serving) MME 208. In this case, the HeNB GW 502 may use its default algorithm, e.g., a weighted round-robin algorithm, to select an MME 208.

In most cases this usage of the default selection algorithm will result in another MME 208 than the UE's 108 current (serving) MME 208 being selected. As a consequence the selected MME 208, which receives the TAU Request from the UE 108 (via NAS signaling), has to retrieve the UE 108 context from the UE's 108 previous MME 208 (i.e., perform an inter-MME, intra-MME pool, context transfer). Inter-MME context transfers are normally only performed between MME pools 500 (i.e. inter-MME pool), whereas in intra-MME pool 500 TAU cases they should not be needed. Therefore, this intra-MME pool 500 context transfer should be seen as redundant and unnecessary, producing unnecessary excess signaling. This is not an insignificant problem, given that the most likely TAI allocation scenario is that femtocells 306 are allocated TAIs from a dedicated range, which is separate from the range used for TAIs in the macro layer. Under these circumstances the problematic scenario will be very common, potentially more or less every time a UE 108 moves from a macrocell 302 to a femtocell 306, since it will then most likely have a serving MME 208 in the same MME pool 500 as the femtocell's HeNB GW 502 and will have to perform TAU in the TA represented by the newly entered femtocell 306. This counteracts the very purpose of allocating a HeNB 504 to an MME pool 500 which controls the macro layer at the same location, i.e. to avoid inter-MME context transfers and handovers during mobility in and out of the femtocell 306.

Figure 5A:
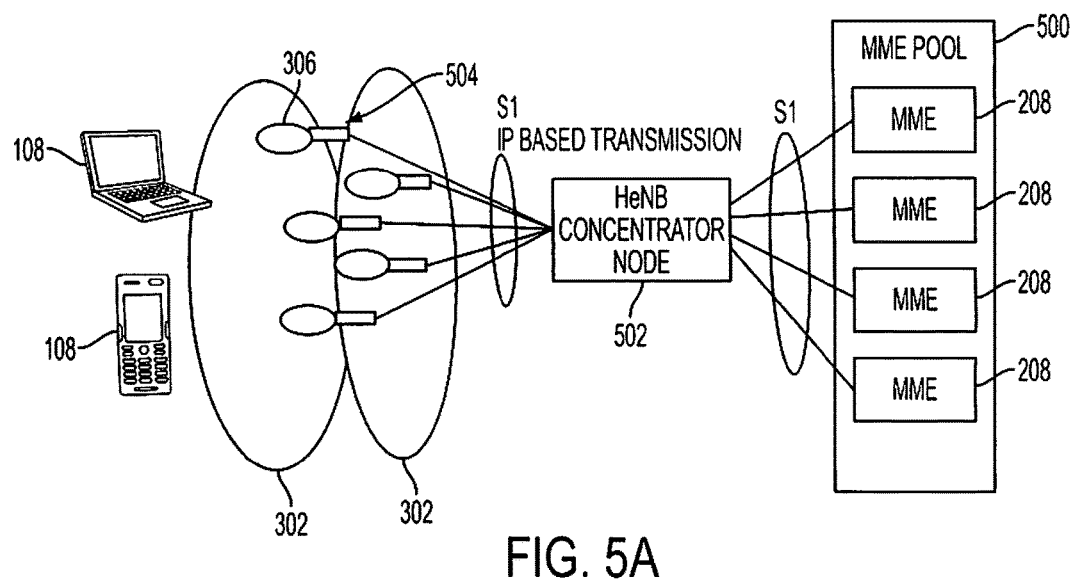
Figure 5B:
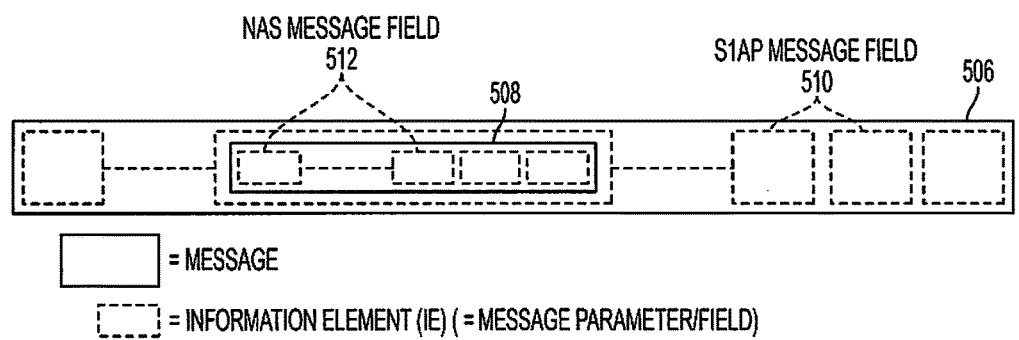
FIG. 5(b) shows an S1AP INITIAL UE MESSAGE containing a Non-Access Stratum (NAS) message according to exemplary embodiments.

Thus, according to exemplary embodiments, in order to enable the HeNB GW 502 to select the proper MME 208 in such problematic cases, exemplary embodiments leverage both the knowledge that the NAS message included in the S1AP INITIAL UE MESSAGE is a TAU Request in these cases and that the TAU request is one of few NAS messages that is not encrypted between the UE 108 and the MME 208. Thus the HeNB GW 502 can peek into the NAS protocol layer and extract the GUTI from the TAU Request and use the GUMMEI in the GUTI to select the proper MME 208 for the UE 108. A general format of an exemplary S1AP INITIAL UE MESSAGE 506 containing a NAS message 508 as well as S1AP message field(s) 510 and NAS message field(s) 512 is shown in FIG. 5(b). According to another exemplary embodiment, in order to enable the HeNB GW 502 to select the proper MME 208 the HeNB 504 extracts the GUMMEI from the RRCConnectionSetupComplete message from the UE 108 and includes the GUMMEI in the S1AP INITIAL UE MESSAGE, so that the HeNB GW 502 can use this parameter to select the MME 208 when the S-TMSI is absent. These exemplary embodiments will now be discussed further with respect to the signaling diagrams of FIGS. 6(a) and 7(a), respectively.

Figure 6A:
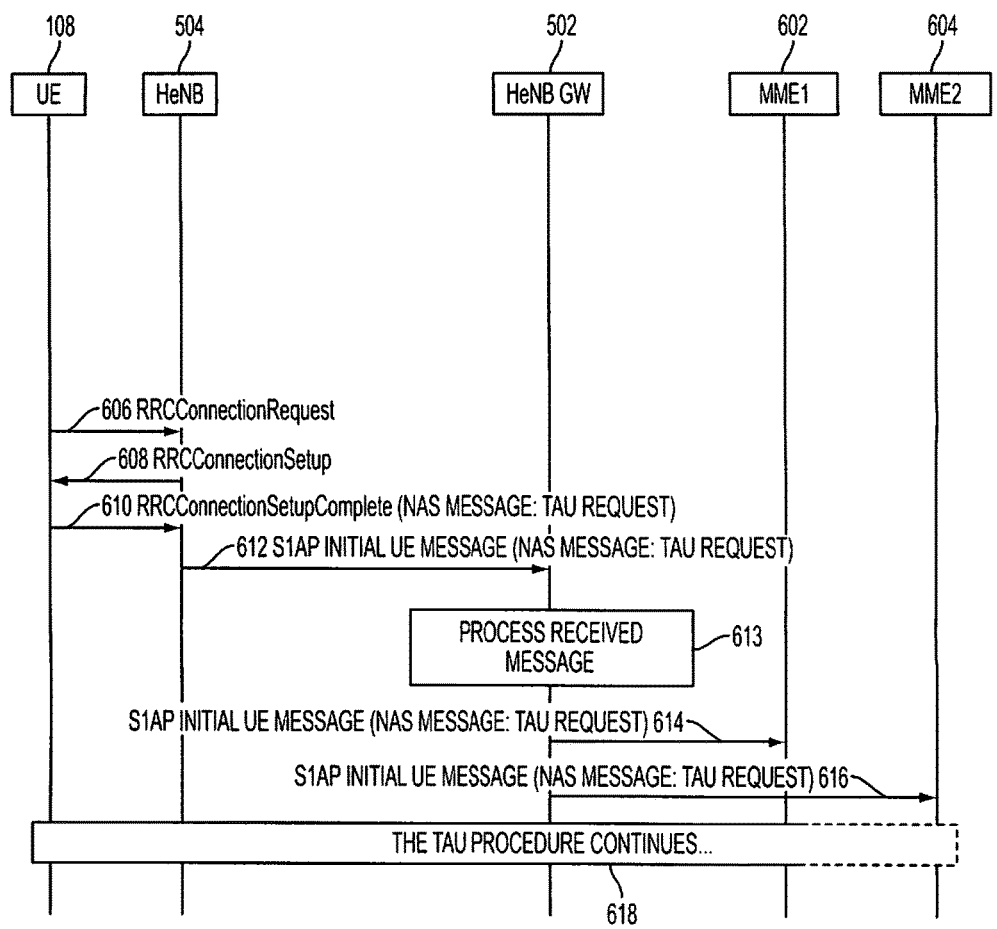
FIG. 6(a) illustrates a signaling diagram according to an exemplary embodiment.

According to the exemplary embodiment of FIG. 6(a), the HeNB GW 502 utilizes the knowledge that, in, e.g., the problematic case described above, the NAS message contained in the S1AP INITIAL UE MESSAGE is a NAS TAU Request and that this is one of the few NAS messages that is sent without encryption between the UE and the MME. Initially, suppose that UE 108 is idle and registered in MME1 602. The UE 108 then moves into a femtocell 306 which is served by the HeNB 504. The femtocell 306 TAI is not included in the UE's 108 TAI list. The UE 108 then transmits an RRCConnectionRequest 606 to the HeNB 504. The HeNB 504 replies with an RRCConnectionSetup message 608. In turn, the UE 108 transmits an RRCConnectionSetupComplete message 610. The HeNB 504 sees only one MME, e.g., the MME represented by the HeNB GW 502, and selects it. The HeNB 504 then transmits an S1AP INITIAL UE MESSAGE 612 (with a piggybacked NAS message: TAU Request) to the HeNB GW 502.

Figure 6B:
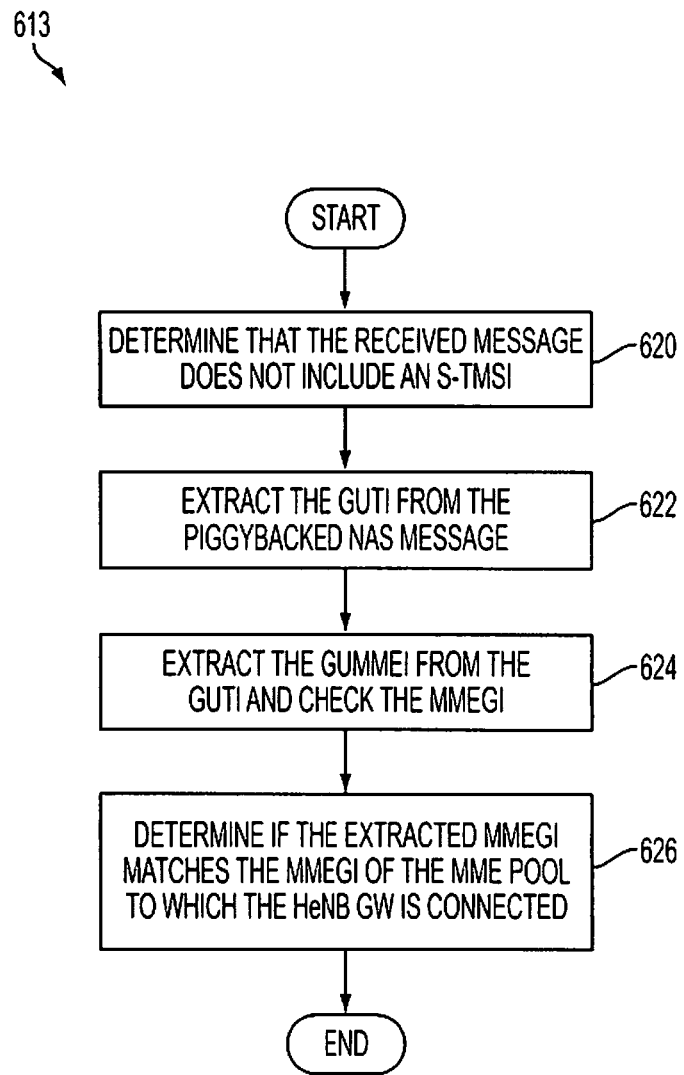
FIG. 6(b) is a flowchart depicting signal processing associated with the signalling diagram of FIG. 6(a)
Figure 6C:
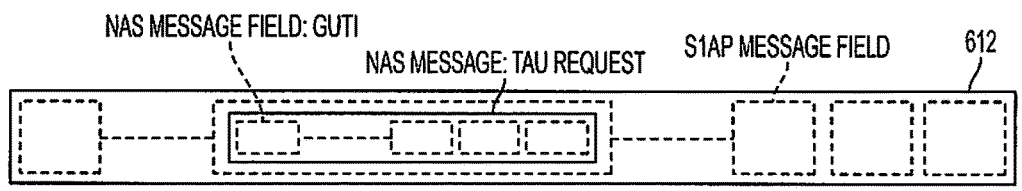
FIG. 6(c) shows an S1AP INITIAL UE MESSAGE containing an NAS Tracking Area Update (TAU) Request and a Globally Unique Temporary Identity (GUTI) according to exemplary embodiments.

The HeNB GW 502 receives the S1AP INITIAL UE MESSAGE 612 (with a piggybacked NAS message: TAU Request) and processes the received message (step 613) as shown in the flow diagram of FIG. 6(b). An example of the S1AP INITIAL UE MESSAGE 612 (with a piggybacked NAS message: TAU Request) is shown in FIG. 6(c). At step 620, the HeNB GW 502 first determines that the received message does not include an S-TMSI. The HeNB GW 502 then extracts the GUTI from the piggybacked NAS message in step 622, extracts the GUMMEI from the GUTI and checks the MMEGI in step 624, i.e., the HeNB GW 502 peeks into the next protocol layer (i.e. NAS), extracts the GUTI from the NAS TAU Request and extracts the GUMMEI from the GUTI. According to exemplary embodiments, the HeNB GW 502 then determines whether the extracted MMEGI matches the MMEGI of the MME pool 500 to which the HeNB GW 502 is connected in step 626.

Returning now to FIG. 6(a), if the extracted MMEGI matches the MMEGI of the MME pool 500 to which the HeNB GW 502 is connected, then the HeNB GW 502 selects the MME indicated by the MMEC in the GUMMEI, in this case MME 1602, and forwards the S1AP INITIAL UE MESSAGE 614 to the MME1 602. If the extracted MMEGI is not a match, then the HeNB GW 502 selects an MME, in this case MME2 604, using a default algorithm and forwards the SLAP INITIAL UE MESSAGE 616 to MME2 604. Also, it is to be understood, that while two messages 614 and 616 are shown in FIG. 6(a), in each use case only one or the other will actually be transmitted. Upon receipt of this message, e.g., either message 614 or message 616, by the selected MME, the TAU procedure continues as shown in block 618.

Figure 7A:
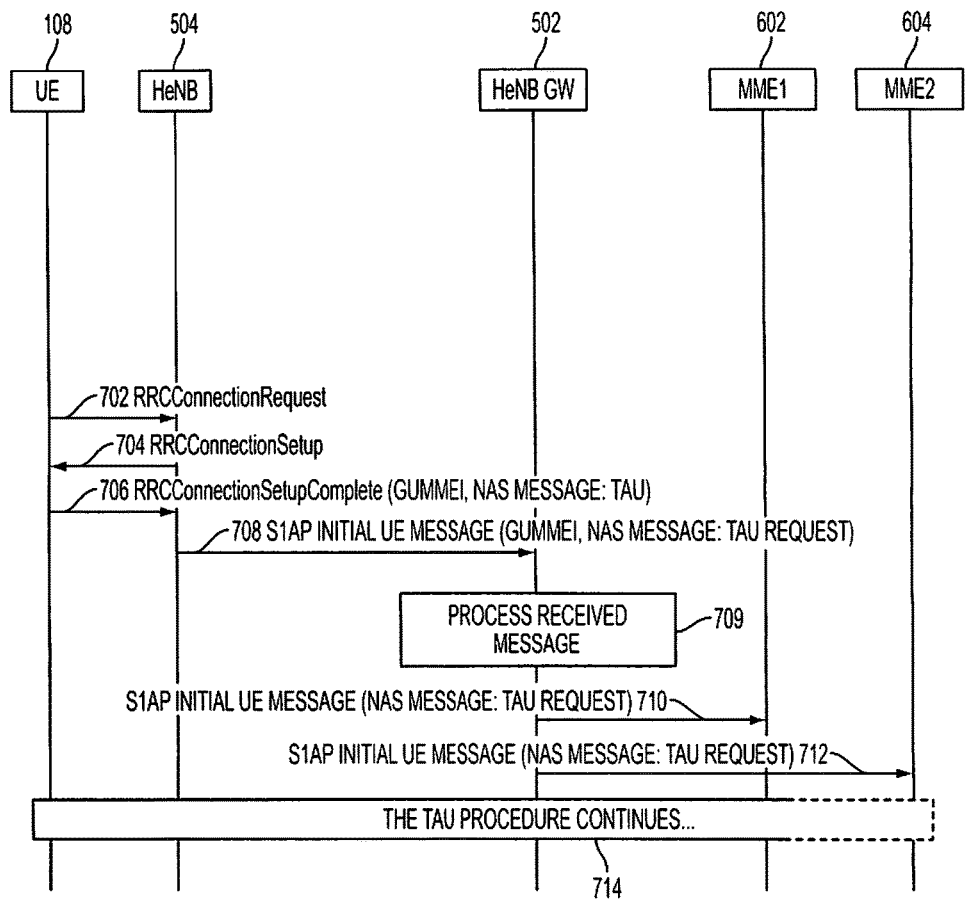
FIG. 7(a) illustrates a signaling diagram according to another exemplary embodiment.

According to another exemplary embodiment, illustrated in the signaling diagram of FIG. 7(a), the HeNB 504 extracts the GUMMEI from the RRCConnectionSetupComplete message from the UE 108 and includes it in the S1AP INITIAL UE MESSAGE. Initially, UE 108 is idle and registered in MME1 602. The UE 108 then moves into a femtocell 306 which is served by the HeNB 504. The femtocell 306 TAI is not included in the UE's 108 TAI list. The UE 108 then transmits an RRCConnectionRequest 702 to the HeNB 504. The HeNB 504 replies with an RRCConnectionSetup message 704. In turn, the UE 108 transmits an RRCConnectionSetupComplete message 706. The HeNB 504 sees only one MME, i.e. the MME represented by the HeNB GW 502, and selects it. The HeNB 504 then extracts the GUMMEI from the RRCConnectionSetupComplete message 706 and includes it in the SLAP INITIAL UE MESSAGE 708 to the HeNB GW 502. This exemplary embodiment thus avoids layer violations by the HeNB GW 502, e.g., by peeking into the NAS protocols.

Figure 7B:
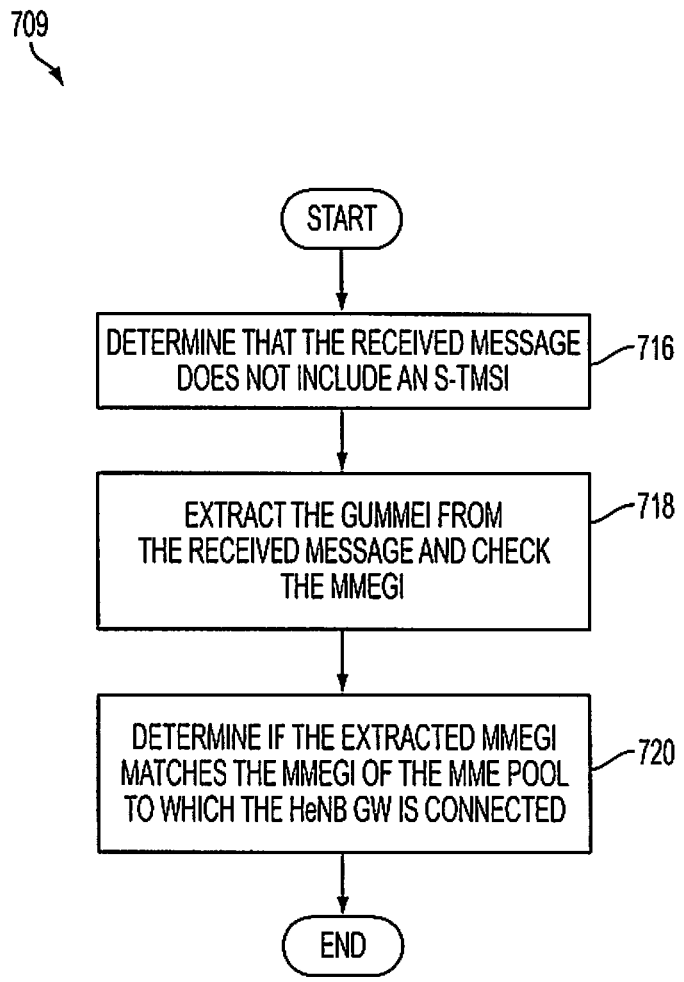
FIG. 7(b) is a flowchart depicting signal processing associated with the signalling diagram of FIG. 7(a)
Figure 7C:
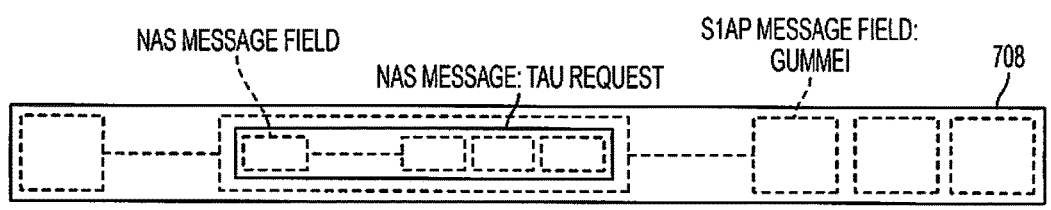
FIG. 7(c) shows an S1AP INITIAL UE MESSAGE containing a Globally Unique MME Identity (GUMMED) according to exemplary embodiments.

According to exemplary embodiments, the HeNB GW 502 receives the S1AP INITIAL UE MESSAGE 708 and processes the received message (step 709) as shown in the flow diagram of FIG. 7(b). An example of the S1AP INITIAL UE MESSAGE 708 (which includes the GUMMEI) is shown in FIG. 7(c). At step 716, the HeNB GW 502 first determines that the received message does not include an S-TMSI. The HeNB GW 502 then evaluates the GUMMEI from the S1AP INITIAL UE MESSAGE 708 and checks the MMEGI in step 718. The HeNB GW 502 then determines whether the MMEGI matches the MMEGI of the MME pool 500 to which the HeNB GW 502 is connected in step 720. Returning now to FIG. 7(a), if the MMEGI matches the MMEGI of the MME pool 500 to which the HeNB GW 502 is connected, then the HeNB GW 502 selects the MME indicated by the MMEC in the GUMMEI, in this case MME1 602, and forwards the S1AP INITIAL UE MESSAGE 710 to MME1 602. If the MMEGI is not a match, then the HeNB GW 502 selects an MME, in this case MME2 604, using a default algorithm, e.g., a weighted round-robin algorithm, and forwards the S1AP INITIAL UE MESSAGE 712 to MME2 604. Optionally, the HeNB GW 502 removes the GUMMEI from the S1AP INITIAL UE MESSAGE (710 or 712) before forwarding the message to the selected MME. Also, it is to be understood, that while two messages 710 and 712 are shown in FIG. 7(a), in each use case only one or the other will actually be transmitted. Upon receipt of this message, e.g., either message 710 or message 712, by the selected MME, the TAU procedure continues as shown in block 714. In an optional variation of this embodiment the HeNB includes only the MMEGI and MMEC parts of the GUMMEI in the S1AP INITIAL UE MESSAGE (which are the only parts of the GUMMEI that the HeNB GW utilizes).

Figure 8:
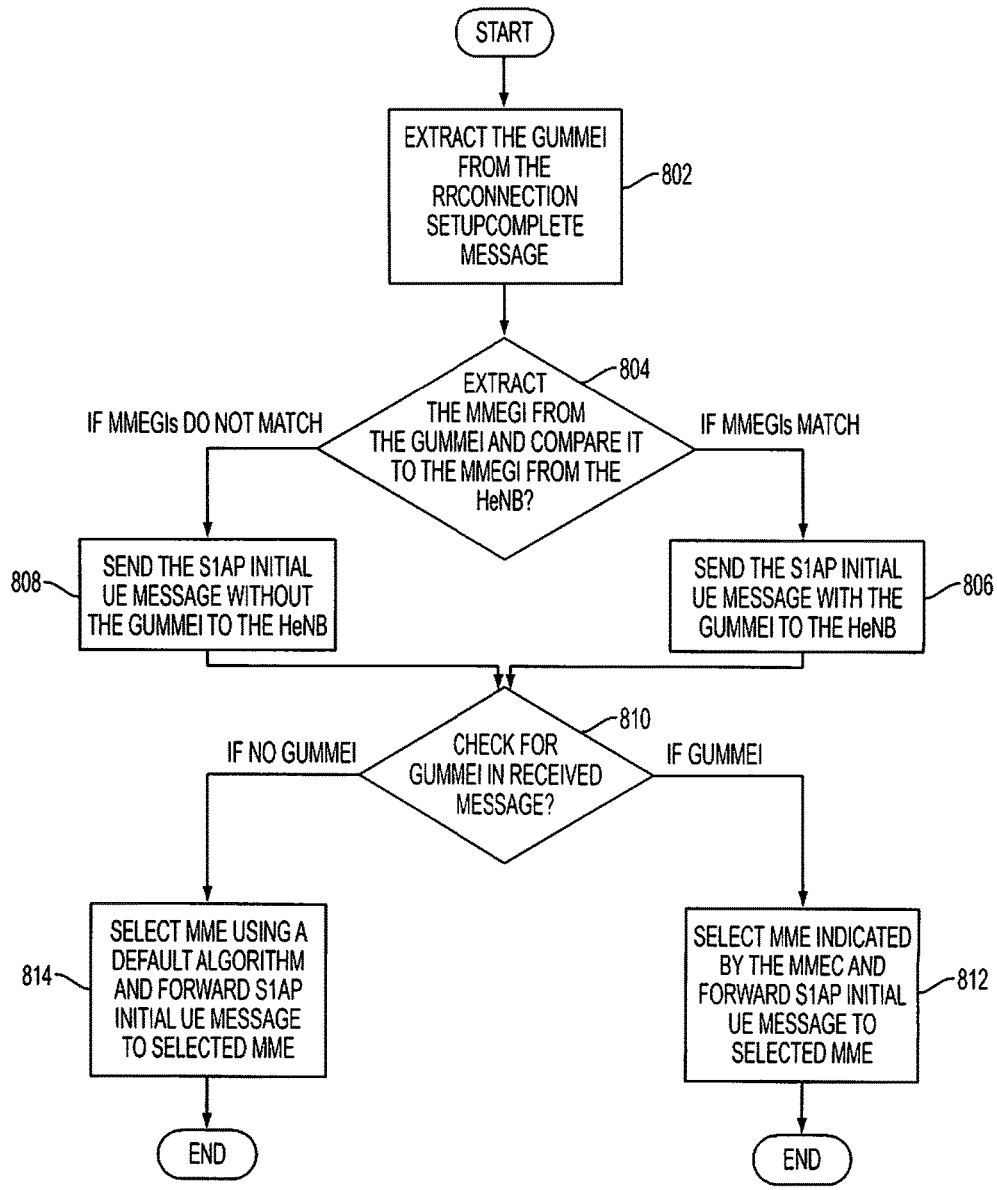
FIG. 8 is a flowchart depicting another method for selecting an MME according to an exemplary embodiment.

According to an alternative exemplary embodiment, a UE 108 moves into a femtocell whose TAI is not included in the UE's TAI list, the UE 108 consequently does not identify itself using its S-TMSI and the HeNB 504 extracts the GUMMEI from the RRCConnectionSetupComplete message from the UE 108 and includes either the GUMMEI or the MMEGI in the S1AP INITIAL UE MESSAGE. This occurs only on condition that the MMEGI part of the GUMMEI matches the MMEGI that the HeNB 504 received from the HeNB GW 502 when the S1 interface was established between the HeNB 504 and the HeNB GW 502. The signalling flows for this exemplary embodiment are similar to the signalling flows shown in FIG. 7(a). This exemplary embodiment will now be described in more detail with respect to the flowchart of FIG. 8. Initially, the HeNB 504 first extracts the GUMMEI from the RRCConnectionSetupComplete message in step 802 and then extracts the MMEGI from the GUMMEI and compares it with the MMEGI that it has previously received from the HeNB GW 502 in step 804. If the MMEGIs match, then the HeNB 504 includes the GUMMEI, or optionally only the MMEC after extracting it from the GUMMEI, in the S1AP INITIAL UE MESSAGE and sends the message to the HeNB GW 502 in step 806. If the MMEGIs do not match, then the HeNB 504 sends the S1AP INITIAL UE MESSAGE to the HeNB GW 502 without including the GUMMEI or the MMEC in the message in step 808.

When the HeNB GW 502 receives the S1AP INITIAL UE MESSAGE from the HeNB it first concludes that no S-TMSI is included in the message. The HeNB GW 502 then checks whether there is a GUMMEI or an MMEC included in the message in step 810. If so, the HeNB GW 502 selects the MME indicated by the MMEC (which the HeNB GW 502 extracts from the GUMMEI in case a GUMMEI was included in the S1AP INITIAL UE MESSAGE) and forwards the S1AP INITIAL UE MESSAGE to the selected MME in step 812. Optionally the HeNB GW 502 removes the GUMMEI or MMEC from the S1AP INITIAL UE MESSAGE before forwarding it to the selected MME. If no GUMMEI or MMEC is included in the S1AP INITIAL UE MESSAGE, then the HeNB GW 502 selects an MME using a default algorithm and forwards the S1AP INITIAL UE MESSAGE to the selected MME in step 814.

Thus it will be appreciated that exemplary embodiments of the present invention enables the HeNB GW 502 to, among other things, select the appropriate MME 208 for a UE 108 which accesses a femtocell 306 whose TAI is not included in the UE's 108 TAI list. In this way, potentially frequent inter-MME (intra-MME pool) context transfers are avoided and the strategy to allocate a HeNBs 504 to the MME pool 500 that is serving the eNB(s) which covers the same location as the HeNBs 504 can fulfill its purpose (i.e. to avoid inter-MME context transfers and handovers).

Figure 9:
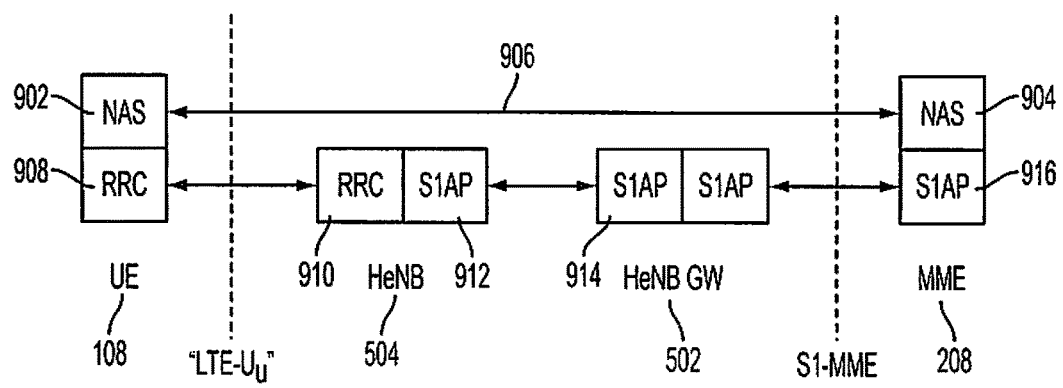
FIG. 9 illustrates control plane signalling according to exemplary embodiments.

The exemplary embodiments described above show different signalling arrangements, among other things, for core network node selection. Such signalling can also be described in terms of communication layers or protocols. According to exemplary embodiments a part of the control layer signalling and associated framework is shown in FIG. 9. Initially in the "top" layer the NAS block 902 of the UE 108 exchanges signalling 906 with the NAS block 904 of the MME 208. This signalling 906 is typically encrypted and relatively transparent to the HeNB 504 and the HeNB GW 502. Thus arrow 906 is not illustrated as being processed by those two devices, nonetheless these signals 906 are sent through these devices and can be "peeked" into as described in exemplary embodiments above. The next layer down of signalling shows the RRC block 908 of the UE 108 communicating with the RRC block 910 of the HeNB 504. The signals which need to be forwarded are then forwarded using S1AP as shown by the S1AP block 912 of the HeNB 504 communicating with the S1AP block 914 of the HeNB GW 502 on towards the S1AP block 916 of the MME 208.

Figure 10:
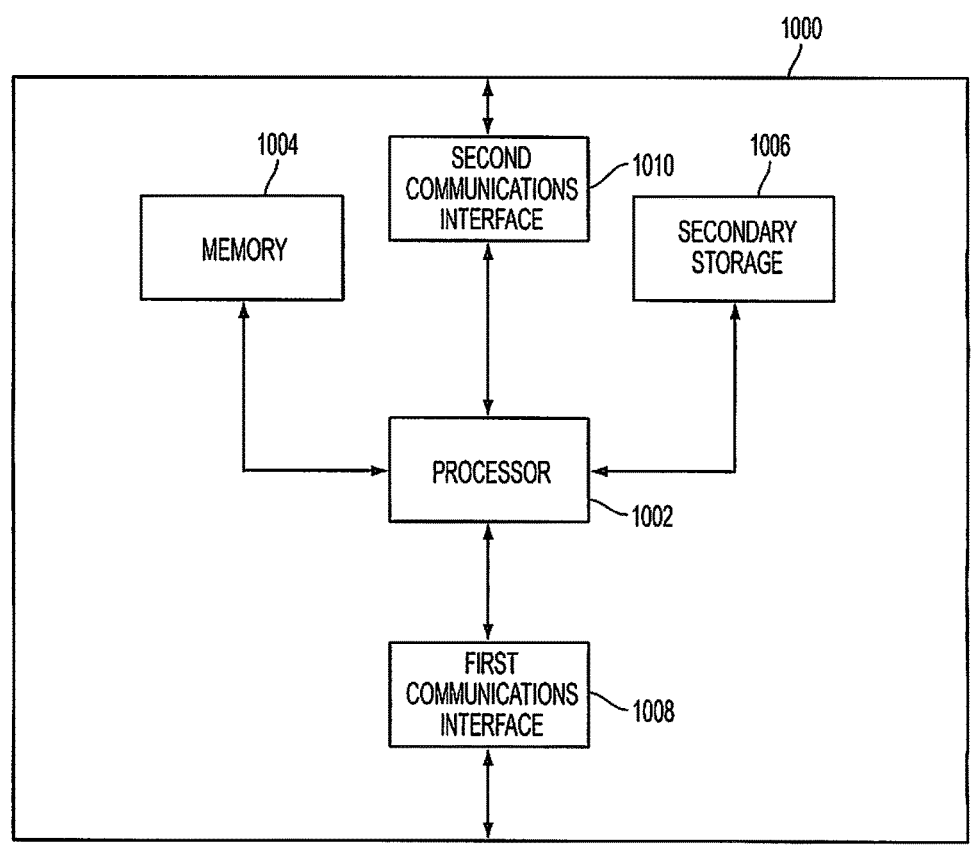
FIG. 10 depicts a communications node according to exemplary embodiments.

The exemplary embodiments described above provide methods and systems for core network node selection. As shown in FIG. 10, communications node 1000 (which can generically represent, e.g., an HeNB 504 or an HeNB GW 502) can contain a processor 1002 (or multiple processor cores), memory 1004, one or more secondary storage devices 1006 and one or more communications interfaces 1008, 1010. As an HeNB 504, the first communications interface 1008 can include, for example, a transceiver configured to transmit signals to, and receive signals from, user equipments 108 over a radio interface and also a second communications interface 1010, e.g., an IP interface such as Ethernet, for transmitting signals to, and receiving signals from, an HeNB GW 502. As an HeNB GW 502, the first communications interface 808 can be configured to transmit signals to, and receive signals from, a plurality of home base stations 504. Such signals can include the above-described request to establish a new signaling connection. As an HeNB GW 502, the second communications interface 1010 can be configured to transmit signals to, and receive signals from, a plurality of nodes (e.g., MMEs 208) associated with a radiocommunication core network. Additionally, processor 802 can perform or support the performance of the tasks required to select an MME 208 for a UE 108, i.e., the communications node 1000 can extract information from messages and select the desired MME 208 as described in the exemplary embodiments above.

Figure 11:
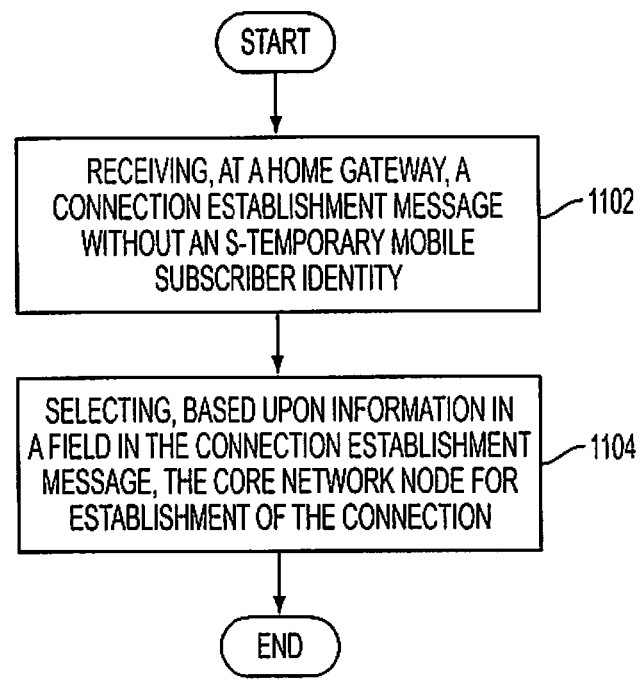
FIG. 11 shows a method flowchart according to exemplary embodiments.

Utilizing the above-described exemplary systems according to exemplary embodiments, a method for selecting a core network node, e.g., MME 208, is shown in the flowchart of FIG. 11. Initially a method for selecting a core network node for establishment of a connection in a radio-communication system includes the steps of: receiving, at a home gateway, a connection establishment message without an S-Temporary Mobile Subscriber Identity (S-TMSI) in step 1102; and selecting, based upon information in a field in said connection establishment message, said core network node for establishment of said connection in step 1104.

Figure 12:
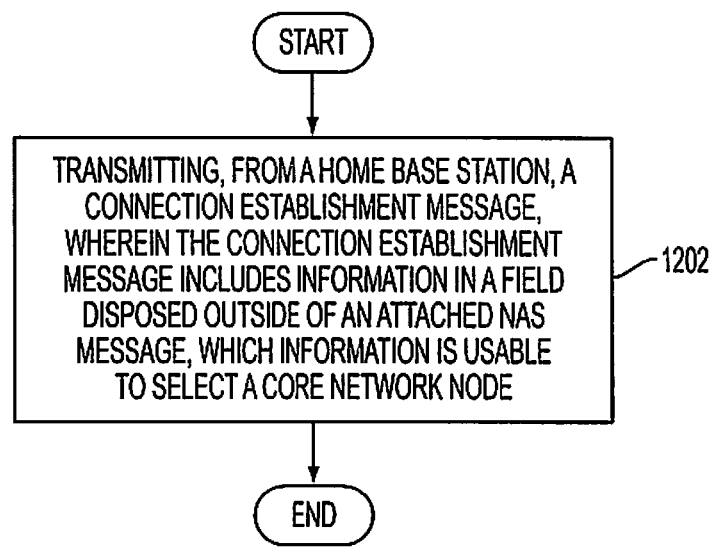
FIG. 12 shows another method flowchart according to exemplary embodiments.

Utilizing the above-described exemplary systems according to exemplary embodiments, another method for selecting a core network node, e.g., MME 208, is shown in the flowchart of FIG. 12. Initially a method for selecting a core network node for establishment of a connection in a radio-communication system includes the step of: transmitting, from a home base station, a connection establishment message, wherein the connection establishment message includes information in a field disposed outside of an attached NAS message in step 1202, which information is usable for selection of a core network node.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

What is claimed is:

1. A method for selecting a Mobility Management Entity (MME) for establishment of a connection between the selected MME and a user equipment (UE) in a radio communication system, the method comprising:
receiving, at a home gateway, a connection establishment message including information facilitating selecting the MME, wherein said home gateway functions as a proxy for a plurality of home base stations;
selecting, by the home gateway, said MME for establishment of said connection using said information,
wherein said information includes at least one of a Globally Unique Mobility Management Entity Identity (GUMMEI) and a Mobility Management Entity Code (MMEC), and
wherein said selecting step includes, if a first MME Group Identity (MMEGI) extracted from said information matches a second MMEGI of an MME pool, selecting said MME from said MME pool, and if said extracted MMEGI does not match said second MMEGI of said MME pool, randomly selecting said MME to be an MME outside said MME pool,
further wherein said selecting step is performed by the home gateway prior to the transmission of the connection establishment message to said selected MME,
wherein said connection establishment message is an S1AP INITIAL UE MESSAGE including a non-access stratum (NAS) message,
wherein said connection establishment message includes, outside said NAS message, one of a GUMMEI field, and an MME Code (MMEC) field; and
wherein when said S1AP INITIAL UE MESSAGE includes said GUMMEI field, then MMEC is extracted from said GUMMEI field.

2. The method of claim 1, further comprising:
transmitting the S1AP INITIAL UE MESSAGE to said selected MME.

3. The method of claim 1, further comprising:
selecting said MME using said MMEC.

4. The method of claim 1, further comprising:
removing said included GUMMEI field or said included MMEC field from said S1AP INITIAL UE MESSAGE before forwarding said S1AP INITIAL UE MESSAGE to said selected MME.

5. A communications node for selecting a Mobility Management Entity (MME) for establishment of a connection between the selected MME and a user equipment (UE) in a radio communication system, the communications node comprising:
a communications interface configured to receive a connection establishment message including information facilitating selecting the MME, wherein said communications node functions as a proxy for a plurality of home base stations; and
a processor configured to select said MME for establishment of said connection using said information,
wherein said information includes at least one of a Globally Unique Mobility Management Entity Identity (GUMMEI) and a Mobility Management Entity Code (MMEC),
wherein said selecting step includes, if a first MME Group Identity (MMEGI) extracted from said information matches a second MMEGI of an MME pool, selecting said MME from said MME pool, and if said extracted MMEGI does not match said second MMEGI of said MME pool, randomly selecting said MME to be an MME outside said MME pool,
further wherein said selecting step is performed by the communications node prior to the transmission of the connection establishment message to said selected MME,
wherein said connection establishment message is an S1AP INITIAL UE MESSAGE including a non-access stratum (NAS) message,
wherein said connection establishment message includes, outside of said NAS message, one of a GUMMEI field and an MME Code (MMEC) field, and
wherein when said S1AP INITIAL UE MESSAGE includes said GUMMEI field, then said processor is configured to extract MMEC from said GUMMEI field.

6. The communications node of claim 5, wherein said communications interface is configured to transmit the S1AP INITIAL UE MESSAGE to said selected MME.

7. The communications node of claim 5, wherein said processor is configured to select said MME based upon said MMEC.

8. The communications node of claim 5, wherein said communications node is configured to remove said included GUMMEI or said included MMEC field from said S1AP INITIAL UE MESSAGE before forwarding said S1AP INITIAL UE MESSAGE to said selected MME.

9. The communications node of claim 5, wherein said communications node is a home gateway.

* * * * *